US009018290B2

(12) United States Patent
Lin et al.

(10) Patent No.: US 9,018,290 B2
(45) Date of Patent: Apr. 28, 2015

(54) RUBBER COMPOSITION WITH IMPROVED BIS-SILANE REINFORCEMENT

(75) Inventors: Chenchy J. Lin, Almere (NL); Atsushi Fukushima, Tokyo (JP); Christopher G. Robertson, Akron, OH (US); William L. Hergenrother, Akron, OH (US); Yaohong Chen, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/976,217

(22) PCT Filed: Dec. 21, 2011

(86) PCT No.: PCT/US2011/066458

§ 371 (c)(1), (2), (4) Date: Jun. 26, 2013

(87) PCT Pub. No.: WO2012/092062

PCT Pub. Date: Jul. 5, 2012

(65) Prior Publication Data

US 2013/0281590 A1 Oct. 24, 2013

Related U.S. Application Data

(60) Provisional application No. 61/428,256, filed on Dec. 30, 2010, provisional application No. 61/529,609, filed on Aug. 31, 2011.

(51) Int. Cl.

*C08K 3/36* (2006.01)
*C08K 5/5419* (2006.01)

(Continued)

(52) U.S. Cl.

CPC ... *C08K 3/36* (2013.01); *B60C 1/00* (2013.01); *C08K 5/5419* (2013.01); *C08K 5/548* (2013.01); *C08K 2201/014* (2013.01); *C08L 7/00* (2013.01); *C08L 9/00* (2013.01); *C08L 9/06* (2013.01)

(58) Field of Classification Search

None

See application file for complete search history.

(56) References Cited

U.S. PATENT DOCUMENTS 6,433,065 B1 8/2002 Lin et al.
6,608,145 B1 8/2003 Lin et al.

(Continued)

FOREIGN PATENT DOCUMENTS

WO 2005105854 11/2005
WO 2005105854 A2 11/2005

(Continued)

OTHER PUBLICATIONS

Scheunemann, Sven, Mar. 30, 2012 International Search Report with Written Opinion from PCT Application No. PCT/US2011/066458 (11 pp.).

(Continued)

*Primary Examiner* — Vu A Nguyen

(74) *Attorney, Agent, or Firm* — Meredith E. Hooker; Jenny L. Sheaffer

(57) ABSTRACT

The present disclosure is directed to tire rubber compositions containing at least one rubbery polymer (with 10 to 100 weight percent of monomer units derived from conjugated diene monomer having between 4 and 8 carbon atoms and 0 to 90 weight percent of monomer units derived from vinyl aromatic monomer); 0.5 to 100 phr of silica filler; 0.05 to 20 phr of a bi-functional silica coupling agent; and 1 to 30 phr of a non-elastomer reactive filler reinforcing agent capable of interacting with at least two silica particles. The bi-functional silica coupling agent and the filler reinforcing agent are utilized in a weight ratio of from 1:100 to 1:0.2. Also disclosed are methods for preparing the tire rubber compositions.

22 Claims, 6 Drawing Sheets

60°C G' VERSUS DEFORMATION STRAIN (EXAMPLES 1-4)

(51) Int. Cl.

| | |
|---|---|
| ***C08K 5/548*** | (2006.01) |
| ***B60C 1/00*** | (2006.01) |
| ***C08L 7/00*** | (2006.01) |
| ***C08L 9/00*** | (2006.01) |
| ***C08L 9/06*** | (2006.01) |

(56) References Cited

U.S. PATENT DOCUMENTS

| | | | | |
|---|---|---|---|---|
| 6,686,408 | B2 | 2/2004 | Pontecorvo | |
| 7,256,231 | B2 | 8/2007 | Lin et al. | |
| 7,476,708 | B2 | 1/2009 | Thielen et al. | |
| 2005/0085583 | A1 | 4/2005 | Hong | |
| 2006/0106143 | A1 | 5/2006 | Lin et al. | |
| 2008/0161489 | A1* | 7/2008 | Halasa et al. | 524/599 |

FOREIGN PATENT DOCUMENTS

| | | | | |
|---|---|---|---|---|
| WO | 2008071208 | | 6/2008 | |
| WO | 2008071208 | A1 | 6/2008 | |
| WO | WO 2010125123 | A1 * | 11/2010 | C08C 19/25 |

OTHER PUBLICATIONS

Lin, Chenchy J. et al., "Mooney Visocsity Stability and Polymer-Filler Interactions in Silica Filled Rubbers," Rubber Chemistry and Technology, vol. 75, Issue 2, pp. 215-245 (May 2002).

ten Brinke, J. W. et al., "The influence of silane sulfur and carbon rank on processing," Rubber Chemistry and Technology, vol. 76, Issue 1, pp. 12-35 (Mar. 2003).

Lin, Chenchy J., et al., "Mooney Viscosity Stability and Polymer-Filler Interactions in Silica-Filled Rubbers," Rubber Chem. Tech., vol. 75, p. 215-245 (2002).

Brinke, J.W. Ten, et al., "The Influence of Silane Sulfur and Carbon Rank on Processing," Rubber Chem. Tech., vol. 76, p. 12-35 (2003.).

Lin, Chen-Chy, et al., "On the Filler Flocculation in Silica-Filled Rubbers Part I. Quantifying and Tracking Filler Flocculation and Polymer-Filler Interaction in Unvulcanized Rubber Compounds," Presented at meeting of Rubber Division, American Chemical Society, Cleveland, Ohio, Oct. 16-19, 2001.

"Momentive Performance Materials" New NXT* Z Ethanol Free Silane, Mar. 2007.

"NXT* Silane" Mar. 2007.

VP Si 363 Production Information Organosilane, Sep. 2009.

Silane Coupling Agents: Connecting Across Boundaries, Gelest Inc., 2006.

Int'l Search Report and Written Opinion (from PCT Stage), Mar. 2012.

Response to EPO, Feb. 19, 2014.

Silquest A-1289, Momentive Performance Materials, Mar. 2011.

First Office Action, Aug. 12, 2014.

Rules 161(1) and 162 Communication from EPO, Aug. 14, 2013.

* cited by examiner

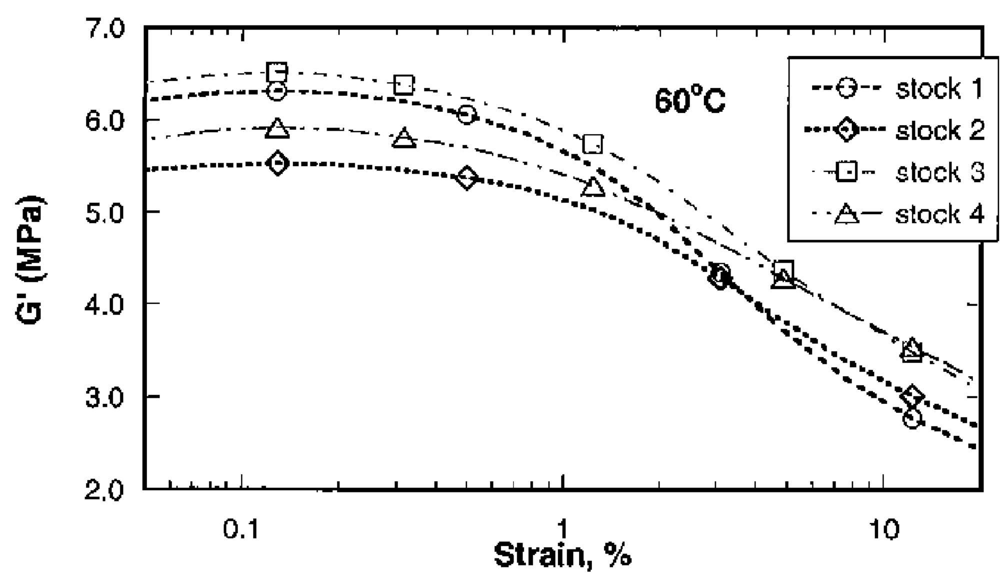
FIGURE 1: 60°C G' VERSUS DEFORMATION STRAIN (EXAMPLES 1-4)

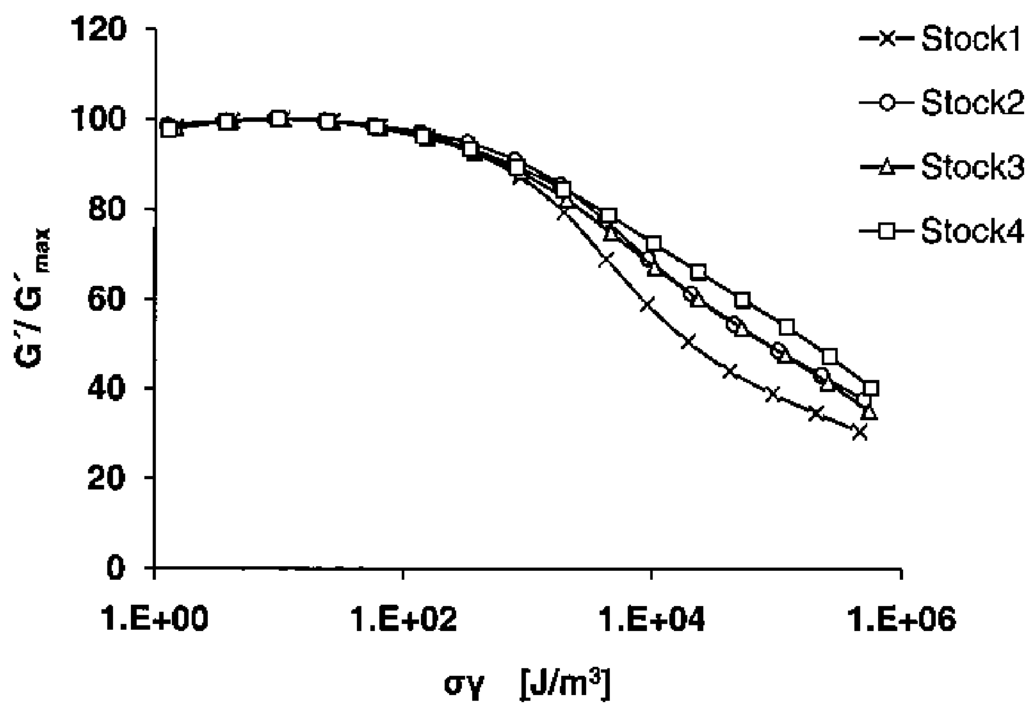
FIGURE 2: G'/G' MAX VERSUS INPUT ENERGY (EXAMPLES 1-4)

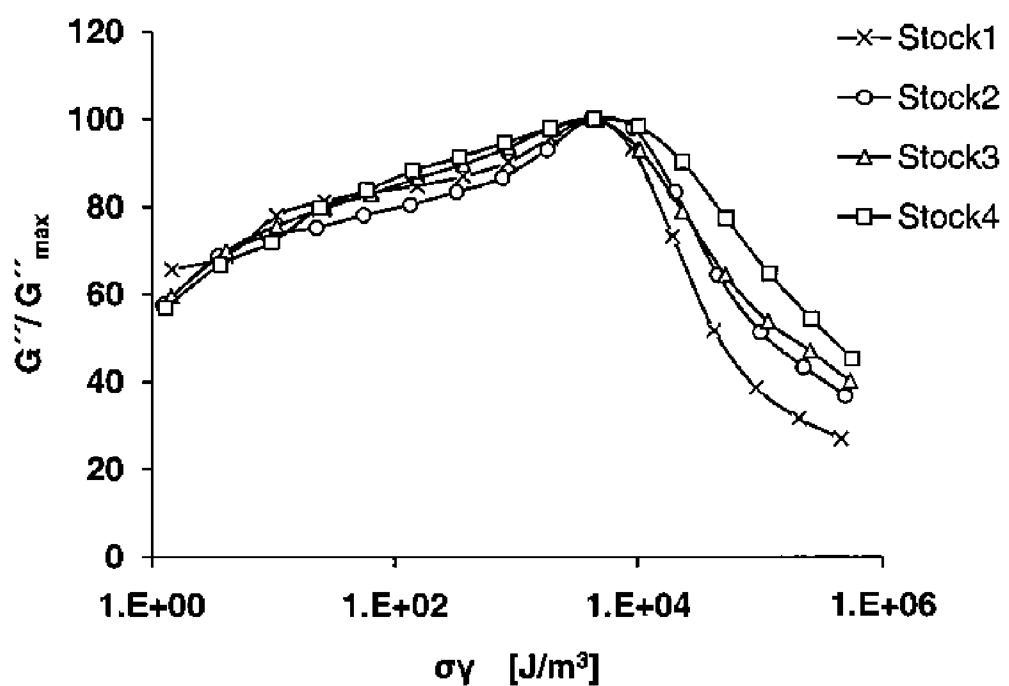
FIGURE 3: G''/G''MAX VERSUS INPUT ENERGY (EXAMPLES 1-4)

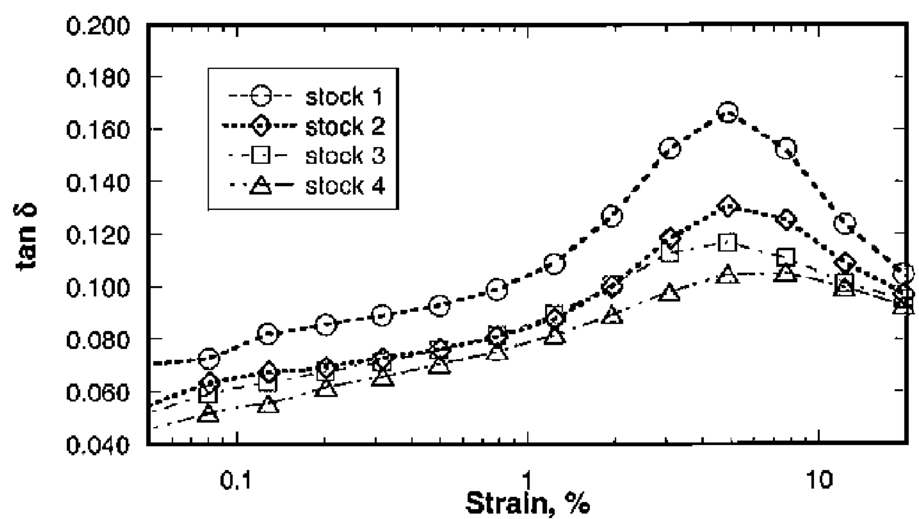
FIGURE 4: TAN Δ VERSUS DEFORMATION STRAIN (EXAMPLES 1-4)

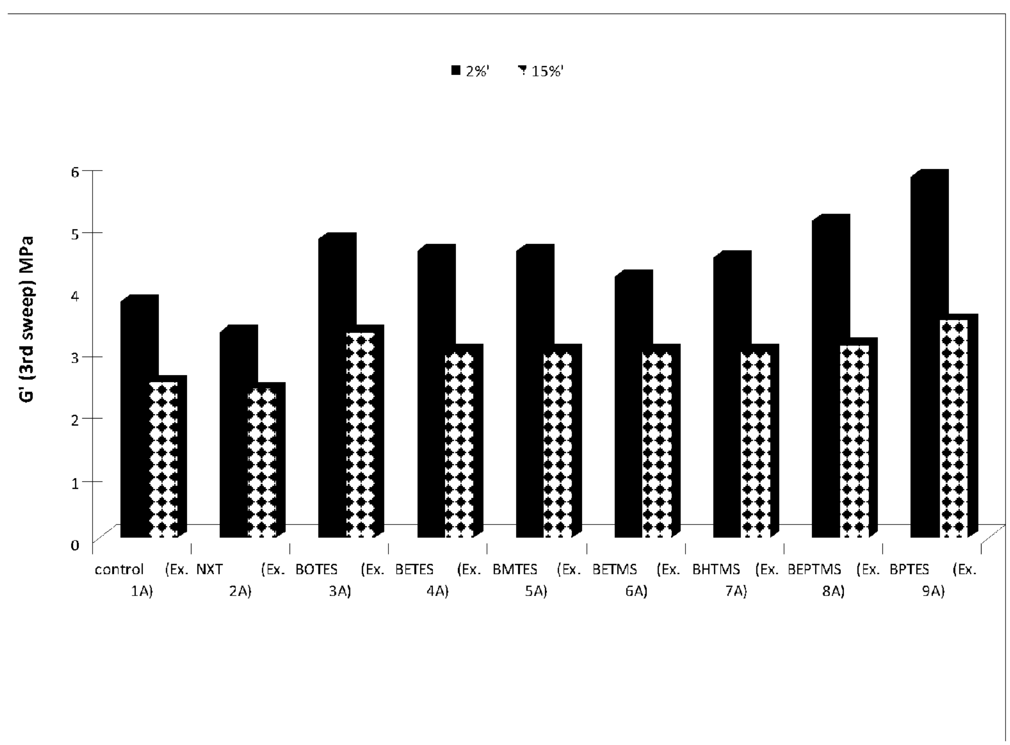
FIGURE 5: G' AT 30 °C (3RD SWEEP) AT 2% AND 15% STRAINS (EXAMPLES 1A-9A)

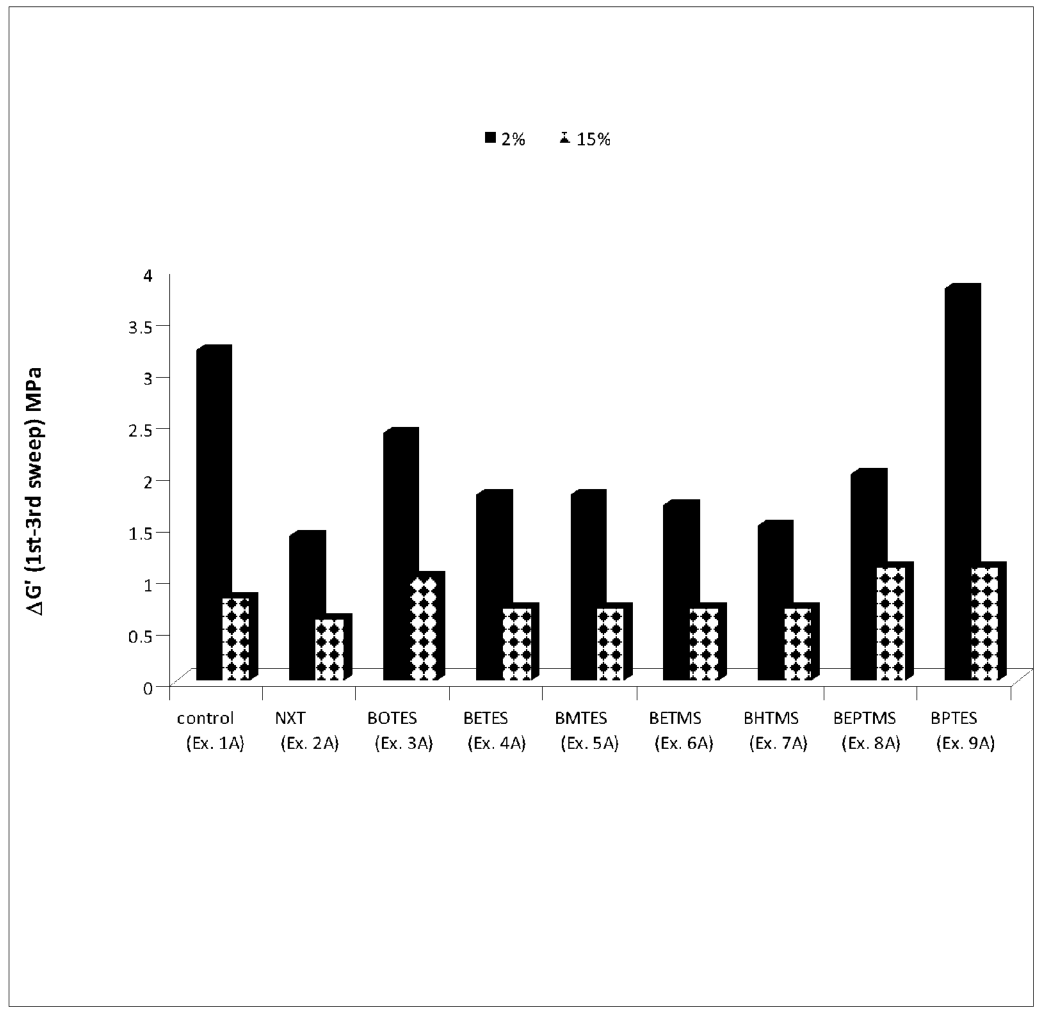
FIGURE 6: ΔG' AT 30 °C (1$^{ST}$- 3$^{RD}$ SWEEPS) AT 2% AND 15% STRAINS (EXAMPLES 1A-9A)

RUBBER COMPOSITION WITH IMPROVED BIS-SILANE REINFORCEMENT

FIELD

The embodiments of the present application relate to a silica-containing tire rubber composition comprised of at least one rubbery polymer, a bi-functional silica coupling agent, and a non-elastomer reactive reinforcing agent capable of reacting with at least two silica particles and to methods for preparing the tire rubber composition.

SUMMARY

The embodiments described herein relate to a silica-containing tire rubber composition comprised of at least one rubbery polymer, a bi-functional silica coupling agent, and a non-elastomer reactive reinforcing agent capable of reacting with at least two silica particles and to methods for preparing the rubber composition. More specifically, the tire rubber composition includes at least one rubbery polymer (which itself comprises 10-100 weight % of monomer units derived from conjugated diene monomer having between 4 and 8 carbon atoms and 0-90 weight % of monomer units derived from vinyl aromatic monomer), 0.5 to 100 phr of silica filler, 0.05 to 20 phr of a bi-functional silica coupling agent, and 1 to 30 phr of a non-elastomer reactive filler reinforcing agent capable of interacting with at least two silica particles. The bi-functional silica coupling agent and the filler reinforcing agent are utilized in a weight ratio of from 1:100 to 1:0.2.

The non-elastomer reactive filler reinforcing agent has formula (I) as follows: (Y)G(Z). In formula (I), G is a separating group selected from the group consisting of $C_1$-$C_{50}$ straight chain and branched alkyl, $C_2$-$C_{50}$ straight chain and branched, $C_6$-$C_{50}$ aromatics, each optionally containing a heteroatom selected from the group consisting of one or more O, one or more N, one S, and combinations thereof and Y and Z can be the same or different and each independently comprise a silica-reactive group of the formula $Si(R^1)_p(OR^2)_{3-p}$ where each $R^1$ independently comprises $C_1$-$C_{20}$ aliphatic, cycloaliphatic or aromatic, $R^2$ is $C_1$-$C_6$ aliphatic or cycloaliphatic and p is an integer from 0 to 2.

In certain embodiments, the (Y)G(Z) formula of the non-elastomer reactive filler reinforcing agent is such that G is selected from the group consisting of $C_2$-$C_{20}$ alkanes, alkenes and aromatics, and optionally contains a heteroatom selected from the group consisting of one or more O, one or more N, one S, and combinations thereof; and Y and Z can be the same or different and each independently comprise a silica-reactive group of the formula $Si(R^1)_p(OR^2)_{3-p}$ with each $R^1$ independently comprising $C_1$-$C_{20}$ aliphatic, cycloaliphatic or aromatic, $R^2$ being $C_1$-$C_6$ aliphatic or cycloaliphatic and p an integer from 0 to 2.

In other embodiments disclosed herein, the (Y)G(Z) formula of the non-elastomer reactive filler reinforcing agent is such that G is selected from the group consisting of $C_1$-$C_{50}$ straight-chain and branched alkyl and $C_2$-$C_{50}$ straight-chain and branched alkenes either optionally containing additional carbon atoms in the form of one or more aromatic rings; V and W can be the same or different and independently comprise a silica-reactive group of the formula $SiR^4{}_p(OR^3)_{3-p}$; each $R^4$ independently comprises $C_1$-$C_{20}$ aliphatic, cycloaliphatic or aromatic; and $R^3$ independently comprises $C_1$-$C_{20}$ aliphatic or cycloaliphatic and p is an integer from 0 to 2. Unless stated otherwise, all aliphatic groups mentioned herein include both straight-chain and branched embodiments.

Other embodiments disclosed herein include methods for preparing a tire rubber composition including the steps of mixing in at least one non-productive master-batch stage at least one rubbery polymer having (1) from 10 to 100 weight percent of monomer units derived from conjugated diene monomer having between 4 and 8 carbon atoms and (2) from 0 to 90 weight percent of monomer units derived from vinyl aromatic monomer, with from 0.5 to 100 phr of silica filler, from 0.05 to 20 phr of a bi-functional silica coupling agent, and from 1 to 30 phr of a non-elastomer reactive filler reinforcing agent of formula (I) that is capable of reacting with at least two silica particle. The resulting product is mixed in a final productive stage with at least one curative.

DESCRIPTION OF FIGURES

FIG. 1 is a graph showing G' at 60° C. versus deformation strain for Examples 1-4.

FIG. 2 is a graph showing G'/G' max versus input energy for Examples 1-4.

FIG. 3 is a graph showing G"/G" max versus input energy for Examples 1-4.

FIG. 4 is a graph showing tan δ versus deformation strain for Examples 1-4.

FIG. 5 is a graph showing G' at 30° C. (3rd sweep) at 2% and 15% strains for Examples 1A-9A.

FIG. 6 is a graph showing ΔG' at 30° C. (1st-3rd sweeps) at 2% and 15% strains for Examples 1A-9A.

DETAILED DESCRIPTION

The present disclosure relates to a silica-containing tire rubber composition comprised of at least one rubbery polymer, a bi-functional silica coupling agent, and a non-elastomer reactive reinforcing agent capable of reacting with at least two silica particles and to methods for preparing the tire rubber composition. The tire rubber composition includes at least one rubbery polymer (which itself comprises 10-100 weight % of monomer units derived from conjugated diene monomer having between 4 and 8 carbon atoms and 0-90 weight % of monomer units derived from vinyl aromatic monomer), 0.5 to 100 phr of silica filler, 0.05 to 20 phr of a bi-functional silica coupling agent, and 1 to 30 phr of a non-elastomer reactive filler reinforcing agent capable of interacting with at least two silica particles. The bi-functional silica coupling agent and the filler reinforcing agent are utilized in a weight ratio of from 1:100 to 1:0.2. In other embodiments, the bi-functional silica coupling agent and the filler reinforcing agent are utilized in a weight ratio of from 4:1 to 1:4, 2:1 to 1:2 or from 0.8:1 to 1.2:1.

The at least one rubbery polymer may be a polymer or a copolymer, or a combination thereof when more than one rubbery polymer is utilized. Preferably the rubbery polymer is not functionalized. Even more preferably, the rubbery polymer does not contain any hydroxy functional group. Examples of the conjugated diene monomer for use in the rubbery polymer include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentanediene, 1,3-cyclohexadiene, 1,3-cycloheptadiene, and 1,3-cyclooctadiene, and derivatives thereof. Mixtures of two or more conjugated dienes may be utilized. Examples of the vinyl aromatic monomer when utilized in the rubbery polymer include, but are not limited to, styrene, α-methyl styrene, p-methylstyrene, and vinylnaphthalene. Mixtures of two or more vinyl aromatic monomers may be utilized. Non-limiting examples of rubbery polymers include styrene-butadiene rubber, polybutadiene and polyisoprene.

The at least one rubbery polymer may be prepared and recovered according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization and emulsion polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of anionic and coordination mechanisms is given.

When the at least one rubbery polymer is produced through anionic polymerization, as a polymerization initiator is preferably used an organic alkaline metal compound, and more preferably a lithium-containing compound. Examples of the lithium-containing compound include, but are not limited to, a hydrocarbyl lithium, a lithium amide compound and so on. The amount of the lithium compound used as the polymerization initiator is preferably within a range of 0.2 to 20 mmol per 100 g of the monomer.

Non-limiting examples of a hydrocarbyl lithium include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium and so on. Among these, alkyl lithiums such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

The method for producing the at least one rubbery polymer through the anionic polymerization using as the polymerization initiator the organic alkaline metal compound or the like is not particularly limited. For example, the at least one rubbery polymer can be produced by polymerizing the conjugated diene monomer alone or a mixture of the conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a combination of two or more.

The anionic polymerization may be carried out in the presence of a randomizer. The randomizer can control the microstructure of the conjugated diene compound, and has an action that 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalent per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. Also, such a polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as monomers, polymerization initiator, solvent and the like are preferable to be used after the reaction obstructing substances such as water, oxygen, carbon dioxide, protonic compound and the like are previously removed.

If the at least one rubbery polymer is produced through the coordination polymerization, as the polymerization initiator is preferably used a rare-earth metal compound, more preferably a combination of the following ingredients (a), (b) and (c).

The ingredient (a) used in the coordination polymerization is selected from the rare-earth metal compound, a complex compound of the rare-earth metal compound and a Lewis base, and so on. Examples of the rare-earth metal compound include, but are not limited to, carboxylate, alkoxide, β-diketone complex, phosphate, phosphite and the like of the rare-earth element. Examples of the Lewis base include, but are not limited to, acetylacetone, tetrahydrofuran, pyridine, N,N-dimethylformamide, thiophene, diphenyl ether, triethylamine, organophosphorus compound, monohydric or dihydric alcohol and so on. For the rare-earth element of the rare-earth metal compound are preferred lanthanum, neodymium, praseodymium, samarium and gadolinium. Among these, neodymium is particularly preferable. Specific examples of the ingredient (a) include neodymium tri-2-ethylhexanoate and a complex compound with acetylacetone thereof, neodymium tri-neodecanoate and a complex compound with acetylacetone thereof, neodymium tri-n-butoxide and so on. These ingredients (a) may be used alone or in a combination of two or more.

The ingredient (b) used in the coordination polymerization is generally selected from organoaluminum compounds. Examples of the organoaluminum compound include trihydrocarbyl aluminum represented by the formula: $(R^9)_3Al$, a hydrocarbyl aluminum hydride represented by the formula: $(R^9)_2AlH$ or $R^9AlH_2$ (wherein $R^9$ is independently a hydrocarbon group having a carbon number of 1-30), a hydrocarbyl aluminoxane with a hydrocarbon group having a carbon number of 1-30 and so on. More specifically, examples of the organoaluminum compound include trialkyl aluminum, dialkyl aluminum hydride, alkyl aluminum dihydride, alkyl aluminoxane and so on. These compounds may be used alone or in a combination of two or more. Moreover, as the ingredient (b) is preferably used a combination of the aluminoxane and another organoaluminum compound.

The ingredient (c) used in the coordination polymerization is selected from a hydrolyzable halogen-containing compound or a complex compound with the Lewis base thereof; organohalogen compounds having a tertiary alkyl halide, benzyl halide or allyl halide; ionic compounds composed of a non-coordinative anion and a counter cation; and so on. Non-limiting examples of the ingredient (c) include alkylaluminum dichloride, dialkylaluminum chloride, silicon tetrachloride, tin tetrachloride, a complex of zinc chloride and a Lewis base such as alcohol or the like, a complex of magnesium chloride and a Lewis base such as alcohol or the like, benzyl chloride, t-butyl chloride, benzyl bromide, t-butyl bromide, triphenyl carbonium tetrakis(pentafluorophenyl)borate and so on. These ingredients (c) may be used alone or in a combination of two or more.

The polymerization initiator may be previously prepared by using the above-described ingredients (a), (b) and (c), and if necessary the same conjugated diene compound as the monomer for the polymerization and/or an unconjugated diene compound. Moreover, it may be used by supporting a part or whole of the ingredient (a) or (c) on an inactive solid. The amount of each ingredient used may be properly set, but the amount of the ingredient (a) is typically 0.001 to 0.5 mmol per 100 g of the monomer. Also, a molar ratio of the ingredient (b)/ingredient (a) is preferably 5 to 1000, and a molar ratio of the ingredient (c)/ingredient (a) is preferably 0.5 to 10.

The polymerization temperature in the coordination polymerization is preferably within a range of −80 to 150° C., more preferably −20 to 120° C. As the solvent used in the coordination polymerization may be used the hydrocarbon solvent inactive to the reaction as mentioned in the anionic polymerization. Also, the concentration of the monomer in the reaction solution is the same as in the case of the anionic polymerization. Moreover, the reaction pressure in the coordination polymerization is the same as in the anionic polymerization, and the starting materials used in the reaction are also preferable to be ones from which the reaction obstructing substances such as water, oxygen, carbon dioxide, protonic compound and the like are substantially removed.

The non-elastomer reactive filler reinforcing agent has at least two functional silane groups that are capable of reacting with the surface of silica particles and lacks any moiety (e.g., mercapto, amino, vinyl, epoxy group) that is capable of reacting with an elastomer or rubbery polymer. As stated above, the non-elastomer reactive filler reinforcing agent is used in the tire rubber composition in an amount of 1 to 30 phr. In other embodiments, the non-elastomer reactive filler reinforcing agent is used in an amount of 2 to 20 phr or 3 to 15 phr.

The non-elastomer reactive filler reinforcing agent has formula (I) as follows: (Y)G(Z). In formula (I), G is a separating group selected from the group consisting of $C_1$-$C_{50}$ straight chain and branched alkyl, $C_2$-$C_{50}$ straight chain and branched, $C_6$-$C_{50}$ aromatics, each optionally containing a heteroatom selected from the group consisting of one or more O, one or more N, one S, and combinations thereof and Y and Z can be the same or different and each independently comprise a silica-reactive group of the formula $Si(R^1)_p(OR^2)_{3-p}$ where each $R^1$ independently comprises $C_1$-$C_{20}$ aliphatic, cycloaliphatic or aromatic, $R^2$ is $C_1$-$C_6$ aliphatic or cycloaliphatic and p is an integer from 0 to 2.

In certain embodiments, the non-elastomer reactive filler reinforcing agent of formula (Y)G(Z) is such that G is selected from the group consisting of $C_2$-$C_{20}$ alkanes, alkenes and aromatics, and optionally contains a heteroatom selected from the group consisting of one or more O, one or more N, one S, and combinations thereof; and Y and Z can be the same or different and each of Y and Z, when present, independently comprise a silica-reactive group of the formula $Si(R^1)_p(OR^2)_{3-p}$ with each $R^1$ independently comprising $C_1$-$C_{20}$ aliphatic (branched or straight chain), cycloaliphatic or aromatic, $R^2$ being $C_1$-$C_6$ aliphatic (branched or straight chain) or cycloaliphatic, and p an integer from 0 to 2. In certain embodiments, the non-elastomer reactive filler reinforcing agent does not contain any sulfur. In certain embodiments, the separating group G is selected from the group consisting of $C_4$ to $C_{12}$ or $C_6$ to $C_{10}$ alkanes, alkenes and aromatics.

In particular embodiments, the non-elastomer reactive filler reinforcing agent is a bis(trialkoxy)silane with the carbon portion of the alkoxy selected from the group consisting of $C_1$ to $C_6$ (i.e., methyl to hexyl), preferably $C_1$ to $C_3$ and even more preferably $C_1$ to $C_2$. Specific examples of bis(trialkoxy) silanes that may be used as the non-elastomer reactive filler reinforcing agent in certain embodiments include, but are not limited to, bis(trimethoxysilyl)ethane, bis(triethoxysilyl) ethane, bis(tributoxysilyl)ethane, bis(triethoxysilyl)propane, bis(trimethoxysilyl)propane, bis(tributoxysilyl)propane, bis (triethoxysilyl)butane, bis(trimethoxysilyl)butane, bis(tributoxysilyl)butane, bis(triethoxysilyl)isobutane, bis(trimethoxysilyl)isobutane, bis(tributoxysilyl)isobutane, bis (triethoxysilyl)hexane, bis(trimethoxysilyl)hexane, bis (tributoxysilyl)hexane, bis(triethoxysilyl)cyclohexane, bis (trimethoxysilyl)cyclohexane, bis(tributoxysilyl) cyclohexane, bis(trimethoxysilyl)heptane, bis(triethoxysilyl) heptane, bis(tributoxysilyl)heptane, bis(triethoxysilyl) octane, bis(trimethoxysilyl)octane, bis(tributoxysilyl) octane, bis(triethoxysilyl)nonane, bis(trimethoxysilyl) nonane, bis(tributoxysilyl)nonane, bis(triethoxysilyl)decane, bis(trimethoxysilyl)decane, bis(tributoxysilyl)decane, bis (triethoxysilyl)dodecane, bis(trimethoxysilyl)dodecane, bis (tributoxysilyl)dodecane, bis(triethoxysilyl)tetradecane, bis (trimethoxysilyl)tetradecane, bis(tributoxysilyl)tetradecane, bis(triethoxysilyl)octadecane, bis(trimethoxysilyl)octadecane, bis(tributoxysilyl)octadecane, and mixtures thereof.

In other embodiments, the non-elastomer reactive filler reinforcing agent of formula (Y)G(Z) is such that G is selected from the group consisting of $C_1$-$C_{50}$ straight-chain and branched alkyl and $C_2$-$C_{50}$ straight-chain and branched alkenes either optionally containing additional carbon atoms in the form of one or more aromatic rings; V and W can be the same or different and each independently comprise a silica-reactive group of the formula $SiR^4_p(OR^3)_{3-p}$; each $R^4$ independently comprises $C_1$-$C_{20}$ aliphatic, cycloaliphatic or aromatic; and $R^3$ independently comprises $C_1$-$C_{20}$ aliphatic, or cycloaliphatic and p is an integer from 0 to 2. In certain embodiments, the separating group G is selected from the group consisting of $C_4$-$C_{20}$ straight-chain and branched alkyl and $C_4$-$C_{20}$ straight-chain and branched alkenes either optionally containing additional carbon atoms in the form of one or more aromatic rings. In other embodiments, the separating group G is selected from the group consisting of $C_4$-$C_8$ straight-chain and branched alkyl and $C_4$-$C_8$ straight-chain and branched alkenes either optionally containing additional carbon atoms in the form of one or more aromatic rings. In certain embodiments, the separating group G is selected from the group consisting of $C_6$-$C_{20}$ and each $R^3$ is selected from the group consisting of $C_1$ to $C_6$ aliphatic. Specific, non-limiting examples of compounds that meet the immediately preceding description and may be used as non-elastomer reactive filler reinforcing agents include, but are not limited to, bis(triethoxysilyl)octane, bis(triethoxysilyl)ethane, bis (triethoxysilyl)methane, bis(triethoxysilyl)hexane, 1,4-bis (trimethoxysilylethyl)benzene and 1,4-bis(trimethoxysilyl) benzene. In certain embodiments, the bi-functional silica coupling agent and the non-elastomer reactive filler reinforcing agent are used in a weight ratio of 1:100 to 1:0.2. In other embodiments, they are used in a weight ratio of 1:15 to 1:0.2 and in yet other embodiments in a weight ratio of 1:4 to 1:1. In certain preferred embodiments, the conjugated diene monomer used in the tire rubber composition comprises butadiene, the vinyl aromatic monomer comprises styrene and the Mooney viscosity of the resulting rubber composition is between 30 and 80 and in other embodiments between 50 and 70. In certain embodiments, the overall tire rubber composition is prepared using less than 20 phr of oil.

As stated above, the bi-functional silica coupling agent is utilized in the tire rubber composition in an amount of 0.05 to 20 phr. In other embodiments, the bi-functional silica coupling agent is utilized in an amount of 0.1 to 15 phr or 0.5 to 10 phr. The bi-functional silica coupling agent is a silica coupling agent having at least one moiety or functionality (e.g., a silyl group) that is reactive with the surface of a silica particle, and at least one moiety or functionality (e.g., a mercapto, amino, vinyl, epoxy or sulfur group) that binds to the elastomer. See, e.g., U.S. Pat. No. 6,608,145 at col. 1, lines 39-46. Various types of bi-functional silica coupling agents are known. In certain embodiments, the bi-functional silica coupling agent is selected from the group consisting of mercaptosilanes, bis(trialkoxysilylorgano)polysulfides, and combinations thereof. Mercaptosilanes suitable for use in the tire rubber composition disclosed herein have the general formula HS—R—$Si(X_n)(R'_{3-n})$ where X is a halogen or an alkoxy (if an alkoxy, of the formula OR" where R" is $C_1$ to $C_6$ aliphatic, cycloaliphatic or aromatic); R is $C_1$ to $C_4$ alkylene; R' is independently $C_1$ to $C_{30}$ alkyl, $C_7$ to $C_{30}$ alkaryl, $C_5$ to $C_{30}$ cycloaliphatic or $C_6$ or $C_{20}$ aromatic; and n is an integer from 1 to 3. When X is a halogen, it can be selected from the group consisting of chlorine, bromine, iodine and fluorine, preferably chlorine. R is preferably $C_1$ to $C_3$ alkylene, X is preferably an alkoxy (with carbon portion of $C_1$ to $C_6$), and n is preferably 3. In some embodiments, the mercaptosilane is a blocked mercaptosilane. In certain embodiments, the bi-functional silica coupling agent is selected from the group consisting of 3-octanoylthio-1-propyltriethoxysilane, 3-mercaptopropyltriethoxysilane, 1-mercaptomethyltriethoxysilane, 2-mercaptoethyltriethoxysilane, 3-mercaptopropylmethyldiethoxysilane, 2-mercaptoethyltriproproxysilane, 18-mercaptooctadecyldiethoxychlorosilane, 3,3'-bis(triethoxysilylpropyl)disulfide, 3,3'-bis(trimethoxysilylpropyl) disulfide, 3,3'-bis(tributoxysilyl-propyl)disulfide, 3,3'-bis (tripropoxylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis (ethyl-di-butoxysilylpropyl)disulfide, 3,3'-bis (propyldiethoxysilylpropyl)disulfide, 3,3'-bis (triisopropoxysilylpropyl)disulfide], 3,3'-bis (dimethoxyphenylsilyl-2-methylpropyl)disulfide, bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Other specific examples of suitable bi-functional silica coupling agents are provided in U.S. Pat. No. 7,256,231 (the entire disclosure of which is hereby incorporated by reference) beginning at column 4, line 4.

The amount of bi-functional silica coupling agent used in the tire rubber composition may vary. In certain embodiments, the bi-functional silica coupling agent is utilized in an amount of 1%-40% by weight of silica filler. In other embodiments, the bi-functional silica coupling agent is utilized in an amount of 1-30%, 2-40% or 4-30% by weight of silica filler.

Typically, in the tire rubber compositions disclosed herein, the overall composition contains 10 to 100 phr of the tire rubber composition disclosed herein and 0 to 90 phr of one or more additional rubbery polymer(s). The one or more additional rubbery polymers suitable for use are varied and include those polymers frequently used in tire rubber compositions, including, but not limited to, styrene-butadiene rubber, polybutadiene, natural rubber, polyisoprene, butyl rubber, halogenated butyl rubber, ethylene-propylene-diene rubber and styrene-butadiene-isoprene rubber.

Suitable silica fillers for use in the tire rubber composition are well known. Examples include precipitated amorphous silica, wet silica (hydrated silicic acid), dry silica (anhydrous silicic acid), fumed silica, calcium silicate and the like. Other suitable fillers include aluminum silicate, magnesium silicate, and the like. Among the listed silica fillers, precipitated amorphous wet-process, hydrated silicas are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method gives the best measure of the reinforcing character of different silica fillers. In certain embodiments, the surface area of the silica filler is about 32 $m^2/g$ to about 400 $m^2/g$, with the range of about 100 $m^2/g$ to about 250 $m^2/g$ being preferred, and the range of about 150 $m^2/g$ to about $220^2/g$ being most preferred. The pH of the silica filler is generally about 55 to about 7 or slightly over, preferably about 5.5 to about 6.8.

The silica filler can be employed in the amount of 0.5 to about 100 parts by weight per hundred parts of the at least one rubbery polymer (phr), preferably in an amount of five to 80 phr and, more preferably, in an amount of 30 to 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil™ 1165MP), and J. M. Huber Corporation.

The tire rubber composition may also optionally include one or more carbon blacks. The carbon black when present is generally used in an amount of from one to 50 phr, with five to 35 phr being preferred. The carbon black can include any of the commonly available, commercially-produced carbon blacks, but those having a surface area (EMSA) of at least $20^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used. Typical suitable carbon blacks are N-110, N-220, N-339, N-330, N-351, N-550, N-660, as designated by ASTM D-1765-82a. The carbon blacks utilized can be in pelletized form or an unpelletized flocculent mass. Preferably, for more uniform mixing, unpelletized carbon black is preferred.

Use of the bi-functional silica coupling agent, non-elastomer reactive reinforcing agent capable of reacting with at least two silica particles and silica filler in the at least one rubber polymer can produce a tire rubber composition with improved properties. More specifically, the tire rubber composition can maintain a relatively consistent Mooney viscosity and tan δ while achieving a dynamic stiffness (G') that is higher than a comparative rubber composition lacking the non-elastomer reactive filler reinforcing agent. More specifically, in certain embodiments, the resulting tire rubber composition has a tan δ that is within ±10%, a Mooney viscosity $ML_{1+4}$ that is at least 10% lower and a dynamic stiffness (G') at least 10% higher than a comparative rubber composition that lacks the non-elastomer reactive filler reinforcing agent. In certain embodiments, the resulting tire rubber composition has a tan δ that is at least 10% lower and/or a dynamic stiffness at 60° C. (G') at least 10% higher than a comparative rubber composition that lacks the non-elastomer reactive filler reinforcing agent. In other embodiments, the resulting tire rubber composition has a tan δ that is at least 20% lower, at least 30% lower, at least 40% lower or at least 50% lower and/or a dynamic stiffness at 60° C. (G') at least 20% higher, at least 30% higher, at least 40% higher or at least 50% higher than a comparative rubber composition that lacks the non-elastomer reactive filler reinforcing agent. Further information concerning exemplary properties of tire rubber compositions made using exemplary non-elastomer reactive filler reinforcing agents are provided in the Examples section, in particular Examples 1A to 9A. In all cases, the comparative rubber composition is a rubber composition that is identical both in chemical composition and in the mixing process by which the ingredients contained therein are combined and mixed to the tire rubber composition disclosed herein, except that the comparative rubber composition lacks any non-elastomer reactive filler reinforcing agent.

As is well-known to those of skill in the art, a multitude of rubber curing agents may be employed in the tire rubber compositions. For example, sulfur or peroxide-based curing systems may be employed. Also, see Kirk-Othmer, ENCYCLOPEDIA OF CHEMICAL TECHNOLOGY, 3rd Edition, Wiley Interscience, New York 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, 2nd Edition, John Wiley & Sons, Inc., 1989, which are incorporated herein by reference. Vulcanizing agents may be used alone or in combination. In one or more embodiments, the preparation of vulcanizable compositions and the construction and curing of the tire is not affected.

Other ingredients that may be employed in the tire rubber composition are also well known to those of skill in the art and include accelerators, oils, waxes, scorch inhibiting agents, processing aids, zinc oxide, tackifying resins, reinforcing resins, fatty acids such as stearic acid, peptizers, and one or more additional rubbers. Examples of oils include paraffinic oils, aromatic oils, naphthenic oils, vegetable oils other than castor oils, and low PCA oils including MES, TDAE, SRAE, heavy naphthenic oils, and black oils.

Also disclosed herein are methods for preparing a tire rubber composition. The tire rubber composition may generally be formed by mixing the ingredients together by methods known in the art, such as, for example, by kneading the ingredients together in a Banbury mixer or on a milled roll. The methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. In certain embodiments, more than one non-productive master-batch mixing stage may be used. The term final productive mixing stage is also known to those of skill in the art and generally understood to be the mixing stage where the vulcanizing agents and vulcanization accelerators are added into the rubber composition. The non-productive master batch mixing stage(s) may be conducted at a temperature of about 130° C. to about 200° C. The final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C. More specifically, the method includes the steps of mixing in at least one non-productive master-batch stage: at least one rubbery polymer having (1) from 10 to 100 weight percent of monomer units derived from conjugated diene monomer having between 4 and 8 carbon atoms and (2) from 0 to 90 weight percent of monomer units derived from vinyl aromatic monomer, from 0.5 to 100 phr of silica filler, from 0.05 to 20 phr of a bi-functional silica coupling agent, from 1 to 30 phr of a non-elastomer reactive filler reinforcing agent capable of reacting with at least two silica particles; and then mixing the resulting product in a final productive stage along with at least one curative.

When the tire rubber compositions disclosed herein are employed in the manufacture of tires, these compositions can be processed into tire components according to ordinary tire manufacturing techniques including standard rubber shaping, molding and curing techniques. Any of the various rubber tire components can be fabricated including, but not limited to, treads, sidewalls, belt skims, and carcass. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

EXAMPLES

Mooney viscosity (ML1+4) values are determined with an Alpha Technologies Mooney viscometer (with a large rotor) The sample is preheated at 130° C. for 1 minute before the rotor starts. The Mooney Viscosity measurement is recorded as the torque after the rotor has rotated 4 minutes at 130° C.

Viscoelastic properties of cured rubber compounds are measured by three different methods. The first method is a temperature sweep test conducted with an Advanced Rheometric Expansion System (ARES) from TA Instruments. The test specimen has a rectangular geometry having a length of 47 mm, a thickness of 2 mm, and a width of 12.7 mm. The length of specimen between the grips on the test machine, i.e., the gap, is approximately 27 mm. The test is conducted using a frequency of 3.14 rad/sec. The temperature is started at −100° C. and increased to 100° C. The strain is 0.5% for the temperature range of −100° C. to −21° C., and 2% for the temperature range of −20° C. to 100° C.

The second viscoelastic test is a strain sweep conducted with an Advanced Rheometric Expansion System (ARES) from TA Instruments. The test specimen has a cylindrical button geometry having a diameter of 9.27 mm and a 15.6 mm length. The test is conducted using a frequency of 3.14 rad/sec. The temperature is held constant at the desired temperature, which was either 30° C. or 60° C. The strain is swept from 0.25% to 14.75%.

The third viscoelastic test is a dynamic compression test done with a Dynastat™ mechanical spectrometer (Dynastatics Instruments Corp.; Albany, N.Y.) using a cylindrical test specimen (9.27 mm diameter×15.6 mm height). The sample is compressed under a static load of 2 kg before testing. After it reached an equilibrium state, the test started with a dynamic compression load of 1.25 kg at a frequency of 1 Hz. The sample was then dynamically compressed and then extended and the resultant displacement, K', K", and hysteresis (tangent delta) were then recorded.

The samples for all of the viscoelastic testing were cured for 15 minutes at 171° C.

Tensile mechanical properties are determined following the guidelines, but not restricted to, the standard procedure described in ASTM-D412, using ring samples with a dimension of 1.27 mm in width and 1.91 mm in thickness. A specific gauge length of 25.4 mm is used for the tensile test. Specimens are strained at a constant rate and the resulting force is recorded as a function of extension (strain). Force readings are expressed as engineering-stresses by reference to the original cross-sectional area of the test piece. The specimens are tested at 25° C. For thermal aging tensile mechanical properties, the specimens are aged at 100° C. for 24 hours before being tested at 25° C.

Rubber compositions containing 45 phr of silica were formulated according to the formulation provided in Table A below. As described below, four separate rubber compositions were prepared, varying the amounts of bi-functional silica coupling agent, filler reinforcing agent and process oil as provided in Table 1 below. Example 1 is a comparative example and lacks any filler reinforcing agent. The total liquid content in each of Examples 1-4 was adjusted according to the presence of the filler reinforcing agent.

The following mixing procedure was utilized to prepare each of Examples 1-4. The master batch was prepared by mixing the non-productive stage (master batch) ingredients listed in Table A in a Brabender mixer that had been preheated to a temperature of 130° C. Mixing was conducted and a drop temperature of 153° C. was utilized. Next, a remill was used. Then, the cooled mixture along with the ingredients listed in Table A for the final productive stage were added into the mixer (preheated to 90° C.) and the temperature was raised to 145° C. with mixing to further homogenize the mixture. The drop temperature was 105° C. Curing was performed at 171° C. for 15 minutes.

TABLE A

| Ingredient | Amount (phr) |
|---|---|
| non-productive stage (master batch) | |
| styrene-butadiene copolymer rubber[1] | 100 |
| silica (Hi-Sil ™ 190) | 45 |

TABLE A-continued

| Ingredient | Amount (phr) |
|---|---|
| stearic acid | 2 |
| bis(triethoxy)octane | Varied as specified in Table 1 |
| antioxidant[2] | 1 |
| Oil | Varied as specified in Table 1 |
| final productive stage | |
| zinc Oxide | 2.5 |
| TBBS[3] | 1.5 |
| MBTS[4] | 1.5 |
| DPG (diphenyl guanidine) | 1.5 |
| sulfur | 1 |

[1]SBR (non-functionalized) containing 25% styrene, Tg of −45° C.
[2]6 PPD
[3]tert-butylbenzothiazole-2-sulfenamide
[4]2,2'-dithiobis(benzothiazole)

TABLE 1

| Ingredient | amount (phr) | | | |
|---|---|---|---|---|
| | Example 1 (Comparative) | Example 2 | Example 3 | Example 4 |
| NXT (bi-functional silica coupling agent)[5] | 12.47 | 12.47 | 12.47 | 12.47 |
| bis-OTES (filler reinforcing agent)[6] | 0.00 | 3.75 | 7.50 | 11.25 |
| Process oil | 12.57 | 8.82 | 5.07 | 1.32 |

[5]3-octanoylthio-1-propyltriethoxysilane, sold under tradename NXT by Momentive Performance Materials)
[6]bis(triethoxysilyl)octane Resulting Properties of the Rubber Compositions of Examples 1-4

The processing properties of the rubber compositions of Examples 1-4 was evaluated by measuring the Mooney viscosity of the compositions. Mooney viscosities of Examples 1-3 are considered to be. The Mooney viscosity of Example 4 is still within an acceptable range for good processing.

TABLE 2

| Mooney | Example # | | | |
|---|---|---|---|---|
| | Example 1 | Example 2 | Example 3 | Example 4 |
| ML | 33.4 | 33.8 | 37.7 | 42.7 |

Compound stiffness of the rubber compositions of Examples 1-4 was measured using the procedures described above (i.e., viscoelastic and tensile mechanical testing). Resulting properties are reported in Table 3 below. Higher compound G', K', modulus at 50% strain and modulus at 200% strain measured at room temperature (25-30° C.) was unexpectedly found in Examples 2-4 with increasing content of bis-OTES. A plot of 60° C. G' versus deformation strain (FIG. 1) shows the unexpected advantages of using bis-silane was obtained without significantly increasing compound Mooney viscosity. The higher strain G' (strain >20%) of a bis-OTES containing stock (Example 2) is higher than the Comparative Example, but the G' is lower at lower strains. It is understood that the lower strain G' is dominated by the degree of filler networking and filler network strength will give higher G' at higher strain. Thus, it is apparent that the rubber composition of Example 2 is more resistant to the deformation amplitude when compared to the Comparative Example. The addition of bis-OTES unexpectedly gives the rubber composition of Example 2 stronger filler network by reinforcing the filler network. When the filler reinforcement exceeds certain levels, the compound G' are higher throughout the entire measured strain range such as those the rubber compositions of Examples 3 and 4. The Examples show that higher tensile moduli measured at 50% and 200% strains were obtained for the bis-OTES containing stocks.

The strain sweep data measured at 60° C. were then replotted in the form of input energy and are shown in FIG. 2 where G' softening shifted to higher energy for bis-OTES containing rubber compositions in Examples 2-4. The G' onset softening is defined as the energy corresponding to the G' started to drop from the plateau. This is more clearly seen if G" (loss modulus) is plotted against the input deformation energy shown in FIG. 3 where the shifting of G" maximum to higher energy was clearly seen in bis-OTES containing rubber compositions. It can be concluded from the data that the silica filler network is reinforced well and is stronger in bis-OTES containing rubber compositions than in the Comparative Example 1. It is also found that the G' measured at a higher strain (10% from strain sweep) is higher for bis-OTES containing rubber compositions. Therefore, the data shown here again provide the evidence of reinforced silica filler network from the use of bis-OTES and the concept of filler reinforcing. The 60° C. hysteresis of the bis-OTES containing rubber compositions are all lower than the Comparative Example 1 in the entire measurement range (FIG. 4).

TABLE 3[1]

| Property | Example # | | | |
|---|---|---|---|---|
| | Example 1 | Example 2 | Example 3 | Example 4 |
| G' temp sweep 30° C., 2% strain | 2.40 | 3.03 | 3.41 | 4.00 |
| G' strain sweep 30° C., 2% strain | 4.37 | 5.03 | 6.28 | 6.42 |
| K' dynast 30° C. | 1.24 | 1.84 | 2.36 | 2.95 |
| Modulus at 50% strain (25° C.) | 1.19 | 1.38 | 1.49 | 1.73 |
| Modulus at 200% strain (25° C.) | 5.39 | 5.87 | 6.11 | 6.82 |

[1]units in MPa

Tire performance data were then predicted based on the measured dynamic mechanical properties. Resulting tan δ are listed in Table 4 below. Lower 60° C. tan δ were found for bis-OTES containing rubber compositions (Examples 2-4). The value of 60° C. tan δ are often used to predict the rolling resistance (R.R.). Thus, it is predicted that a rubber composition mixed with the bis-OTES or other filler reinforcing agent will have improved rolling resistance.

TABLE 4

| Compound 60° C. tan δ | | | | |
|---|---|---|---|---|
| Property | Example # | | | |
| | Example 1 | Example 2 | Example 3 | Example 4 |
| Temp sweep | 0.0704 | 0.0682 | 0.0591 | 0.0570 |
| Strain sweep | 0.127 | 0.100 | 0.101 | 0.0891 |
| Compression Dynastat | 0.0455 | 0.0388 | 0.0318 | 0.0291 |
| Average 60° C. tan δ | 0.0809 | 0.0691 | 0.0639 | 0.0584 |

The tensile mechanical test results for Examples 1-4 are shown in Table 5 below. The improved modulus at 50% strain and modulus at 200% strain by comparable mechanical properties including breaking strength ($T_b$), elongation at break ($E_b$) (%) and toughness are found for the bis-OTES containing rubber compositions. The mechanical strengths of $T_b$ and toughness are retained only in bis-OTES containing rubber compositions after they were thermally aged in 100° C. for 24 hours.

TABLE 5

Tensile Mechanical Properties Before And After Thermal Aging at 100° C. for 24 hours

| Property | Example 1 | Example 2 | Example 3 | Example 4 |
|---|---|---|---|---|
| Ring Tensile (25° C.) | | | | |
| Modulus at 50% strain (MPa) | 1.19 | 1.38 | 1.49 | 1.73 |
| Modulus at 200% strain(MPa) | 5.39 | 5.87 | 6.11 | 6.82 |
| Modulus at 300% strain (MPa) | 9.08 | | | |
| $T_b$ (MPa) | 8.82 | 8.91 | 8.71 | 8.75 |
| $E_b$ (%) | 291 | 278 | 268 | 247 |
| Toughness (MPa) | 11.51 | 11.33 | 10.895 | 10.43 |
| Ring Tensile (25° C. After thermal Aging at 100° C. For 24 hours) | | | | |
| Modulus at 50% strain (MPa) | 1.27 | 1.47 | 1.71 | 2.16 |
| Modulus at 200% strain (MPa) | 6.18 | 6.46 | 7.01 | 8.37 |
| Modulus at 300% strain (MPa) | | | | |
| $T_b$ (MPa) | 7.57 | 9.04 | 7.64 | 9.46 |
| $E_b$ (%) | 229 | 252 | 212 | 221 |
| Toughness (MPa) | 7.62 | 9.95 | 7.51 | 10 |

From the Examples 1-4, the concept of reinforcing filler network was demonstrated to enhance the compound modulus. More importantly, it strengthened the filler network and provided more resistance to the applied deformation. With the use of bis-silanes for silica filled rubber, the reinforcing filler network concept is not only confirmed, but also unexpectedly benefits a rubber composition with a comparable compound viscosity but higher modulus. Additional benefits of lower 60° C. tan delta and improved thermally aged mechanical strengths were also found in the stock with well reinforced filler network.

Examples 1A-9A

Various silica-containing rubber compositions were formulated using the ingredients listed in Table 6. The following mixing procedure was utilized to prepare each of Examples 1A-9A. Examples 1A and 2A are comparative examples with Ex. 1A containing no bi-functional silica coupling agent and no filler reinforcing agent and 2A containing no filler reinforcing agent. The master batch was prepared by mixing the non-productive stage (master batch) ingredients listed in Table 6 in a Brabender mixer that had been preheated to a temperature of 130° C. As indicated in Table 7, the total liquid content in each composition was adjusted corresponding to the amount of filler reinforcing agent utilized so as to maintain a constant amount of 8 phr (combined filler reinforcing agent+process oil). Mixing was conducted and a drop temperature of 153° C. was utilized. Next, a remill was used. Then, the cooled mixture along with the ingredients listed in Table 6 for the final productive stage were added into the mixer (preheated to 90° C.) and the temperature was raised to 145° C. with mixing to further homogenize the mixture. The drop temperature was 105° C. Curing was performed at 171° C. for 15 minutes.

TABLE 6

| Ingredient | Amount (phr) |
|---|---|
| non-productive stage (master batch) | |
| SBR[1] | 100 |
| stearic acid | 2 |
| silica (Hi-SilTM 190) | 45 |
| process oil | varied as specified in Table 7 |
| antioxidant[2] | 1 |
| filler reinforcing agent | varied as specified in Table 7 |
| bi-functional silica coupling agent | varied as specified in Table 7 |
| final productive stage | |
| zinc oxide | 2.5 |
| TBBS[3] | 1.5 |
| MBTS[4] | 1.5 |
| DPG (diphenyl guanidine) | 1.5 |
| Sulfur | 1.5 |

[1]SBR (non-functionalized) containing 25% styrene, Tg of −45° C.
[2]6 PPD
[3]tert-butylbenzothiazole-2-sulfenamide
[4]2,2'-dithiobis(benzothiazole)

TABLE 7

| Ingredient/amount (phr) | Ex. 1A | Ex. 2A | Ex. 3A | Ex. 4A | Ex. 5A | Ex. 6A | Ex. 7A | Ex. 8A | Ex. 9A |
|---|---|---|---|---|---|---|---|---|---|
| NXT (bi-functional silica coupling agent)[5] | 0 | 4.5 | 4.5 | 4.5 | 4.5 | 4.5 | 4.5 | 4.5 | 4.5 |
| filler reinforcing agent/amount | 0 | 0 | BOTES[6] 8 | BETES[7] 6.47 | BMTES[8] 6.21 | BETMS[9] 4.93 | BHTES[10] 5.96 | BEPTMS[11] 6.83 | BPTMS[12] 7.34 |
| Process oil | 12.5 | 8 | 0 | 1.53 | 1.79 | 3.07 | 2.05 | 1.17 | 0.66 |

[5]3-octanoylthio-1-propyltriethoxysilane, sold under tradename NXT by Momentive Performance Materials)
[6]$C_8H_{14}(Si(OC_2H_5)_3)_2$/bis(triethoxysilyl)octane
[7]$C_2H_4(Si(OC_2H_5)_3)_2$
[8]$C_1H_2(Si(OC_2H_5)_3)_2$
[9]$C_2H_4(Si(OCH_3)_3)_2$
[10]$C_6H_{12}(Si(OC_2H_5)_3)_2$
[11]$C_6H_4(CH_2CH_2Si(OCH_3)_3)_2$
[12]$C_6H_4(Si(OCH_3)_3)_2$ Resulting Properties of the Rubber Compositions of Examples 1A-9A Various properties of the rubber compositions of Examples 1A-9A were measured using the procedures described above in paragraphs 37-42. Mechanical properties of the rubber compositions are listed in Table 9 and compound modulus properties are listed in Table 10. Generally, as shown in Table 9, the addition of the filler reinforcing agent increased the hardness of the silica filled rubber composition. Also, in comparison to the control rubber composition 1A and the reference rubber composition 2A, higher compound G', M50 and M200 along with lower Mooney viscosity were unpredictably found in the rubber compositions with the filler reinforcing agent. (Mooney viscosity data is shown in Table 8.) Use of the filler reinforcing agents unexpectedly allowed for a higher modulus compound without increasing compound viscosity. Usually, higher modulus in filler rubber compositions is accompanied by an increase in Mooney viscosity, often times leading to challenges in processing the higher viscosity rubber composition. Generally, the more extended (i.e., longer) the separating group in the filler reinforcing agent, the better the silica reinforcement. The reduction achieved in A tan δ and ΔG' with more flexible separating group in the filler reinforcing agent indicated better filler dispersion. Table 10 shows lower 60° C. tan δ for the filler reinforcing agent-containing rubber compositions. As mentioned previously, the value of 60° C. tan δ is often used to predict the rolling resistance of a tire made using the rubber composition. Thus, it is predicted that rubber compositions containing filler reinforcing agent will result in improved rolling resistance in tires made using such compositions. Generally, the value of 0° C. tan δ is an indication of wet traction, the value of 30° C. tan δ is an indication of dry-handling and, as mentioned, the value of 60° C. tan δ is an indication of rolling resistance or hysteresis.

TABLE 8

Green Stock Mooney Measurement (130° C.)

| Property | Ex. 1° | Ex. 2° | Ex. 3A | Ex. 4A | Ex. 5A | Ex. 6A | Ex. 7A | Ex. 8A | Ex. 9A |
|---|---|---|---|---|---|---|---|---|---|
| Mooney Viscosity | 83.7 | 47 | 50.4 | 69.7 | 67.2 | 73 | 63.9 | 66.4 | 70.1 |
| T5 (minutes)[1] | 8.83 | 15.43 | 10.68 | 12.17 | 13.95 | 11.8 | 9.27 | 9.78 | 12.88 |

[1]scorch safety (indicative of processing safety time), measured using ASTM D 1646.

TABLE 9

Mechanical Properties

| Property | Ex. 1A | Ex. 2° | Ex. 3A | Ex. 4A | Ex. 5A | Ex. 6A | Ex. 7A | Ex. 8A | Ex. 9A |
|---|---|---|---|---|---|---|---|---|---|
| Hardness (Shore A) | 66.8 | 64.7 | 75.9 | 74.3 | 72.2 | 73.3 | 75.9 | 76.7 | 76.2 |
| M50 (MPa)[1] | 0.78 | 1.06 | 1.69 | 1.52 | 1.33 | 1.58 | 1.63 | 1.72 | 1.65 |
| M200 (MPa)[2] | 2.57 | 4.5 | 6.98 | 6.74 | 5.86 | 7.01 | 8.16 | 7.94 | 7.26 |
| $T_b$ (MPa)[3] | 5.46 | 10.65 | 10.35 | 10.75 | 10.90 | 9.98 | 9.13 | 9.24 | 12.24 |
| $E_b$ %[4] | 396 | 353 | 269 | 280 | 311 | 261 | 217 | 223 | 290 |
| Toughness (MPa) | 10.68 | 15.68 | 12.71 | 13.36 | 14.57 | 11.77 | 8.79 | 9.31 | 15.6 |

[1]Modulus at 50%
[2]Modulus at 200%
[3]Tensile strength
[4]Elongation at break

TABLE 10

Compound Modulus Properties

| Property | Ex. 1A | Ex. 2A | Ex. 3A | Ex. 4° | Ex. 5A | Ex. 6A | Ex. 7A | Ex. 8A | Ex. 9A |
|---|---|---|---|---|---|---|---|---|---|
| Strain Sweep (5%, 0° C., final, ARES HT) | | | | | | | | | |
| G' (MPa) | 4.773 | 3.306 | 5.586 | 5.431 | 5.157 | 5.029 | 5.466 | 6.740 | 7.359 |
| G'' (MPa) | 0.696 | 0.511 | 0.653 | 0.742 | 0.743 | 0.676 | 0.701 | 0.900 | 0.938 |
| tan δ | 0.146 | 0.154 | 0.117 | 0.137 | 0.144 | 0.134 | 0.128 | 0.134 | 0.128 |
| Strain Sweep (5%, 30° C., final, ARES HT) | | | | | | | | | |
| G' (MPa) | 4.169 | 2.833 | 5.209 | 4.695 | 4.632 | 4.360 | 4.875 | 5.838 | 6.691 |
| G'' (MPa) | 0.519 | 0.382 | 0.424 | 0.491 | 0.543 | 0.447 | 0.432 | 0.577 | 0.718 |
| tan δ | 0.125 | 0.135 | 0.081 | 0.105 | 0.117 | 0.103 | 0.089 | 0.099 | 0.107 |

TABLE 10-continued

| Compound Modulus Properties | | | | | | | | | |
|---|---|---|---|---|---|---|---|---|---|
| | Example | | | | | | | | |
| Property | Ex. 1A | Ex. 2A | Ex. 3A | Ex. 4° | Ex. 5A | Ex. 6A | Ex. 7A | Ex. 8A | Ex. 9A |
| Strain Sweep (5%, 60° C., final, ARES HT) | | | | | | | | | |
| G' (MPa) | 4.091 | 2.681 | 4.838 | 4.514 | 4.251 | 4.376 | 4.357 | 5.335 | 5.984 |
| G'' (MPa) | 0.492 | 0.315 | 0.267 | 0.430 | 0.465 | 0.446 | 0.288 | 0.388 | 0.634 |
| tan δ | 0.120 | 0.117 | 0.055 | 0.095 | 0.109 | 0.102 | 0.066 | 0.073 | 0.106 |
| ΔG' (MPa) | 2.679 | 1.610 | 1.625 | 2.628 | 2.684 | 2.461 | 1.730 | 2.374 | 4.083 |
| Δ tan δ | 0.06109 | 0.2213 | 0.01119 | 0.03941 | 0.0454 | 0.0322 | 0.01493 | 0.01498 | 0.05042 |

In order to demonstrate the silica filler network that is reinforced by the addition of the filler reinforcing agent, the mechanical history dependence of the rubber stiffness was examined. The samples were deformed under a strain sweep measurement with a frequency of 3.14 rad/seconds and strain sweeping from 0.25% to 14.75% where samples were rested at this deformation for 3 minutes. A flowing strain sweep measurement on these samples at the same frequency with strain sweeping from 14.75% to 0.25% was then conducted. After the samples were rested at a strain of 0.25% for 3 minutes, they were deformed following the procedures previously described. It is believed that the low-strain G' is dominated by the degree of filler networking so that filler network strength gives higher G' at higher strain. The filler network of the stocks containing more flexible bridging spacer in the filler reinforcing agent (e.g., Example 3) was more resistant to the deformation amplitude when compared to those of the control and NXT-only containing stocks. This also indicated the addition of the filler reinforcing agent in silica-containing rubbers gave stronger filler networks by reinforcing the filler network.

FIGS. 5 and 6 show graphs resulting from plotting the values of G' at 30° C. for the third sweep at 2% and 15% (more precisely 14.75%) strains and the values of ΔG' (first-third sweeps) at 30° C. at 2% and 15% strains. (Values plotted are show in Table 11, below.) As shown in FIG. 5, values of G' for Examples 3A to 9A are higher (at both 2% and 15% strains) showing the reinforcing of the silica networks and less dependence on mechanical history. The more extended the bridging spacer in the non-elastomer reactive filler reinforcing agent, the better the silica reinforcement. Generally, values of ΔG' were lower for Examples 3A to 9A. In conclusion, the silica filler network appears to have been reinforced better and stronger in the stocks containing the non-elastomer reactive filler reinforcing agent than NXT and the control stock without the silane. Bis-silane reinforcing networks in the non-elastomer reactive filler reinforcing agent are more deformation resistant and show better G' suspension in wide strain range. This is expected to deliver more consistent performance under various driving conditions.

TABLE 11

| G' and ΔG' Values for FIGS. 5 and 6 | | | | | | | | | |
|---|---|---|---|---|---|---|---|---|---|
| | Example | | | | | | | | |
| Property | Ex. 1A | Ex. 2A | Ex. 3A | Ex. 4A | Ex. 5A | Ex. 6A | Ex. 7A | Ex. 8A | Ex. 9A |
| G' at 30° C. (2% strain, 1st sweep) | 7 | 4.7 | 7.2 | 6.4 | 6.4 | 5.9 | 6 | 7.1 | 9.6 |
| G' at 30° C. (2% strain, 3rd sweep) | 3.8 | 3.3 | 4.8 | 4.6 | 4.6 | 4.2 | 4.5 | 5.1 | 5.8 |
| ΔG' at 30° C. (2% strain) | 3.2 | 1.4 | 2.4 | 1.8 | 1.8 | 1.7 | 1.5 | 2 | 3.8 |
| G' at 30° C. (15% strain, 1st sweep) | 3.3 | 3 | 4.3 | 3.7 | 3.7 | 3.7 | 3.7 | 4.2 | 4.6 |
| G' at 30° C. (15% strain, 3rd sweep) | 2.5 | 2.4 | 3.3 | 3 | 3 | 3 | 3 | 3.1 | 3.5 |
| ΔG' at 30° C. (15% strain) | 0.8 | 0.6 | 1 | 0.7 | 0.7 | 0.7 | 0.7 | 1.1 | 1.1 |

We claim:

1. A tire rubber composition, comprising:

(a) at least one rubbery polymer comprising (i) 10 to 100 weight percent of monomer units derived from conjugated diene monomer having between 4 and 8 carbon atoms;

(ii) 0 to 90 weight percent of monomer units derived from vinyl aromatic monomer;

(b) 0.5 to 100 phr of silica filler;

(c) 0.05 to 20 phr of a bi-functional silica coupling agent which is a mercaptosilane; and (d) 1 to 30 phr of a non-elastomer reactive filler reinforcing agent capable of interacting with at least two silica particles and having the formula (I)

$$(Y)G(Z) \qquad (I)$$

wherein G is a separating group selected from the group consisting of $C_1$-$C_{50}$ straight chain and branched alkylene, $C_2$-$C_{50}$ straight chain and branched alkenylene, $C_6$-$C_{50}$ aromatics, each optionally containing a heteroatom selected from the group consisting of one or more O, one or more N, one S, and combinations thereof and Y and Z can be the same or different and each independently comprise a silica-reactive group of the formula $Si(R^1)_p(OR^2)_{3-p}$ wherein each $R^1$ independently comprises $C_1$-$C_{20}$ aliphatic, cycloaliphatic or aromatic, $R^2$ is $C_1$-$C_6$ aliphatic or cycloaliphatic and p is an integer from 0 to 2; and wherein the bi-functional silica coupling agent and the filler reinforcing agent are utilized in a weight ratio of from 1:100 to 1:0.2.

2. The tire rubber composition of claim 1, wherein the G of the non-elastomer reactive filler reinforcing agent is selected from the group consisting of $C_2$-$C_{20}$ alkylene, and alkenylene, and $C_6$-$C_{20}$ aromatics, each optionally containing a heteroatom selected from the group consisting of one or more O, one or more N, one S, and combinations thereof.

3. The tire rubber composition of claim 1, wherein the G of the non-elastomer reactive filler reinforcing agent is selected from the group consisting of $C_1$-$C_{50}$ straight-chain, branched alkylene and cycloalkylene and $C_2$-$C_{50}$ straight chain and branched alkenylene either optionally containing additional carbon atoms in the form of one or more aromatic rings.

4. The tire rubber composition of claim 1, wherein the rubbery polymer does not contain any hydroxy functional groups.

5. The tire rubber composition of claim 1 wherein the bi-functional silica coupling agent and the filler reinforcing agent are utilized in a weight ratio of from 1:15 to 1:0.2.

6. The tire rubber composition of claim 1 wherein the bi-functional silica coupling agent and the non-elastomer reactive filler reinforcing agent are utilized in a weight ratio of from 1:4 to 4:1.

7. The tire rubber composition of claim 1 wherein the bi-functional silica coupling agent and non-elastomer reactive filler reinforcing agent are utilized in a weight ratio of from 0.8:1 to 1.2:1.

8. The tire rubber composition of claim 1, wherein the bi-functional silica coupling agent is present in an amount of 1-40% by weight of silica filler.

9. The tire rubber composition of claim 1, wherein the bi-functional silica coupling agent comprises a compound having formula HS—R—$Si(Z_n)(R'_{3-n})$ where Z is a halogen or an alkoxy (of the formula OR" where R" is $C_1$ to $C_6$ aliphatic, cycloaliphatic, or $C_6$ to $C_{20}$ aromatic, and n is an integer from 1 to 3.

10. The tire rubber composition of claim 1, wherein the bi-functional silica coupling agent is a blocked mercaptosilane.

11. The tire rubber composition of claim 1, wherein the bi-functional silica coupling agent comprises at least one of the following: 3 octanoylthio-1-propyltriethoxysilane, 3-mercaptopropyltriethoxysilane, 1-mercaptomethyltriethoxysilane, 2-mercaptoethyltriethoxysilane, 3-mercaptopropylmethyldiethoxysilane, 2-mercaptoethyltriproproxysilane, and 18-mercaptooctadecyldiethoxychlorosilane.

12. The tire rubber composition of claim 1, wherein the non-elastomer reactive filler reinforcing agent comprises a bis(trialkoxy) silane.

13. The tire rubber composition of claim 1, meeting at least one of the following: (a) a tan δ that is at least 10% lower, (b) a Mooney viscosity $ML_{1+4}$ at 140° C. that is within ±10%, and (c) a dynamic stiffness (G') at least 10% higher than a comparative rubber composition that lacks the non-elastomer reactive filler reinforcing agent.

14. The tire rubber composition of claim 1 wherein the non-elastomer reactive filler reinforcing agent has G selected from the group consisting of $C_4$-$C_{20}$ straight-chain and branched alkylene and $C_4$-$C_{20}$ straight-chain and branched alkenylene either optionally containing additional carbon atoms in the form of one or more aromatic rings.

15. The tire rubber composition of claim 1 wherein the conjugated diene monomer is butadiene and the vinyl aromatic monomer when present is styrene and the tire rubber composition has a Mooney viscosity at 140° C. of 30 to 80.

16. The tire rubber composition of claim 1 containing less than 20 phr of oil.

17. The tire rubber composition of claim 1 wherein G is selected from the group consisting of $C_6$-$C_{20}$ alkylene and alkenylene and each $R^2$ is selected from the group consisting of $C_1$ to $C_6$ straight-chain and branched aliphatic.

18. A process for preparing a tire rubber composition having the composition according to claim 1, the process:

(1) mixing in at least one non-productive master-batch stage the (a), (b), (c) and (d) components; and (2) mixing in a final productive stage the product of step (1) and at least one curative.

19. A tire rubber composition, comprising:

(a) at least one rubbery polymer comprising (iii) 10 to 100 weight percent of monomer units comprising 1,3-butadiene;

(iv) 0 to 90 weight percent of monomer units comprising styrene;

(b) 0.5 to 100 phr of silica filler;

(c) 0.05 to 20 phr of a bi-functional silica coupling agent which is a mercaptosilane; and (d) 1 to 30 phr of a non-elastomer reactive filler reinforcing agent capable of interacting with at least two silica particles and having the formula (I)

$$(Y)G(Z) \quad (I)$$

wherein G is a separating group selected from the group consisting of $C_1$-$C_{50}$ straight chain and branched alkylene, $C_2$-$C_{50}$ straight chain and branched alkenylene, $C_6$-$C_{50}$ aromatics, each optionally containing a heteroatom selected from the group consisting of one or more 0, one or more N, and combinations thereof and Y and Z can be the same or different and each independently comprise a silica-reactive group of the formula $Si(R^1)_p(OR^2)_{3-p}$ wherein each $R^1$ independently comprises $C_1$-$C_{20}$ aliphatic, cycloaliphatic or aromatic, $R^2$ is $C_1$-$C_6$ aliphatic or cycloaliphatic and p is an integer from 0 to 2; and wherein the bi-functional silica coupling agent and the filler reinforcing agent are utilized in a weight ratio of from 1:100 to 1:0.2.

20. The tire rubber composition of claim 19, wherein the G of the non-elastomer reactive filler reinforcing agent is selected from the group consisting of $C_2$-$C_{20}$ alkylenes and, alkenylenes, and $C_6$-$C_{20}$ aromatics, each optionally containing a heteroatom selected from the group consisting of one or more O, one or more N, one S, and combinations thereof.

21. The tire rubber composition of claim 19, wherein the G of the non-elastomer reactive filler reinforcing agent is selected from the group consisting of $C_1$-$C_{50}$ straight-chain, branched alkylene and cycloalkylene and $C_2$-$C_{50}$ straight chain and branched alkenylenes either optionally containing additional carbon atoms in the form of one or more aromatic rings.

22. The tire rubber composition of claim 19, wherein the rubbery polymer does not contain any hydroxy functional groups.

* * * * *